US012318952B1

(12) United States Patent
Norng

(10) Patent No.: US 12,318,952 B1
(45) Date of Patent: Jun. 3, 2025

(54) VINYL WRAP CUTTER

(71) Applicant: Norng LLC, Houston, TX (US)

(72) Inventor: Mike Norng, Houston, TX (US)

(73) Assignee: Norng LLC, Houston, TX (US)

( * ) Notice: Subject to any disclaimer, the term of this patent is extended or adjusted under 35 U.S.C. 154(b) by 0 days.

(21) Appl. No.: 19/037,107

(22) Filed: Jan. 25, 2025

(51) Int. Cl.

| | |
|---|---|
| ***B26B 5/00*** | (2006.01) |
| ***B26B 1/08*** | (2006.01) |
| ***B26B 29/00*** | (2006.01) |
| *B26B 29/06* | (2006.01) |

(52) U.S. Cl.
CPC *B26B 1/08* (2013.01); *B26B 5/00* (2013.01); *B26B 29/06* (2013.01)

(58) Field of Classification Search
None
See application file for complete search history.

(56) References Cited

U.S. PATENT DOCUMENTS

| | | | | |
|---|---|---|---|---|
| 5,003,696 A * | 4/1991 | Spehar | B26B 5/002 30/294 |
| 2005/0229403 A1 * | 10/2005 | Diaz | B26B 5/006 30/294 |
| 2014/0298663 A1 * | 10/2014 | Horgan | B26B 29/06 30/292 |

FOREIGN PATENT DOCUMENTS

| | | | |
|---|---|---|---|
| CN | 107839210 A * | 3/2018 | |
| FR | 2944467 A1 * | 10/2010 | B26B 3/08 |
| JP | 2021069434 A * | 5/2021 | |

OTHER PUBLICATIONS

English translation of CN-107839210-A, dated Mar. 27, 2018.*
Englihsh translation of JP-2021069434-A, dated May 6, 2021.*
English translation of FR-2944467, dated Oct. 22, 2010.*

* cited by examiner

*Primary Examiner* — Hwei-Siu C Payer
(74) *Attorney, Agent, or Firm* — Larson & Larson; Frank Liebenow; Justin P. Miller

(57) ABSTRACT

A vinyl wrap cutter makes a clean cut in a sheet of material (e.g., vinyl, thermoplastic polyurethane, polyvinyl chloride or other material) that is adhered to a vehicle (e.g., car, motorcycle, truck, minivan, boat, bicycle, wagon). A guide post of the vinyl wrap cutter follows a feature or contour of the vehicle and spaces the cut a fixed distance from the feature/contour. For example, following the contour of the vehicle's hood, roof, trunk, doors, etc. The vinyl wrap cutter has at least one blade held within a body and a guide post with fastener that holds the body together. The guide post traverses the feature/contour of the vehicle to provide a cut that matches the feature/contour of the vehicle.

16 Claims, 6 Drawing Sheets

VINYL WRAP CUTTER

FIELD OF THE INVENTION

This invention relates to the field of cutting tools and more particularly to a device for cutting vehicles wrapped in a sheet of material.

BACKGROUND OF THE INVENTION

In recent years, many vehicles are wrapped in vinyl or other similar materials such as thermoplastic polyurethane, polyvinyl chloride. Wrapping of a vehicle is done for any of several reasons. For one, before wrapping, the vinyl is printed with advertisements that will be visible to people who see the vehicle. Other reasons are to hide dents or scratches, or to change the color of the vehicle.

In any wrapping method, the vinyl must be cut. It is very difficult to cut the vinyl to match the contour of the vehicle so as to have edges that are even. For example, it takes a lot of skill, steady hands, and patience to cut an edge that matches the contour/curvature of the hood of a car.

What is needed is a cutting device that follows the contour of the vehicle to provide a precision cut that matches the contour of the vehicle.

SUMMARY OF THE INVENTION

The vinyl wrap cutter makes a clean cut in a sheet of material (e.g., vinyl, thermoplastic polyurethane, polyvinyl chloride or other material) that adheres to a vehicle (e.g., car, motorcycle, truck, minivan, boat, bicycle, wagon). The vinyl wrap cutter follows a contour of the vehicle and spaces the cut a fixed distance from the contour. For example, following the contour of the vehicle's hood, roof, trunk, doors, etc. The vinyl wrap cutter has at least one blade held within a body and a guide that holds the body together and traverses the contour of the vehicle to provide a cut that matches the contour of the vehicle.

In one embodiment, a vinyl wrap cutter is disclosed with a main section and a back section. The main section and the back section form a body of the vinyl wrap cutter which has an elongated slot. There is an indentation formed in either the main section or the back section and a cutting blade is held in the indentation. A guide post that has a hollow core and a shoulder is provided. A fastener is also provided. The fastener is longer than the guide post and is inserted in the hollow core to extend through the elongated slot and is held in place by a nut, thereby the fastener holds the guide post to the body of the vinyl wrap cutter and holds the main section to the back section.

In another embodiment, a cutting device for cutting a sheet of material that is adhered to a vehicle is disclosed. The cutting device includes a main section and a back section. The main section and the back section form a body of the cutting device and, the body of the cutting device has an elongated slot. There are two indentations formed in either the main section or the back section and two cutting blades, each cutting blade of the two cutting blades held in a respective indentation of the two indentations. A guide post has a hollow core and a shoulder. A fastener is provided. The fastener is longer than the guide post. The fastener is inserted in the hollow core and extends through the elongated slot and held in place by a nut, thereby the fastener holds the guide post to the body of the cutting device and holds the main section to the back section.

In another embodiment, a method for cutting a sheet of material (e.g., vinyl, thermoplastic polyurethane, polyvinyl chloride or other material) that is adhered to a vehicle is disclosed. The method includes providing the cutting device as above and positioning the shoulder of the guide post of the cutting device to rest against a feature of the vehicle. Next, the sheet of material is positioned to engage with one of the two cutting blades and the cutting device is pushed across the sheet of material while maintaining the guide post of the cutting device resting against the feature of the vehicle, thereby cutting the sheet of material a fixed distance from each point on the feature of the vehicle.

BRIEF DESCRIPTION OF DRAWINGS

The invention can be best understood by those having ordinary skill in the art by reference to the following detailed description when considered in conjunction with the accompanying drawings in which.

DETAILED DESCRIPTION OF THE INVENTION

Figure 1:
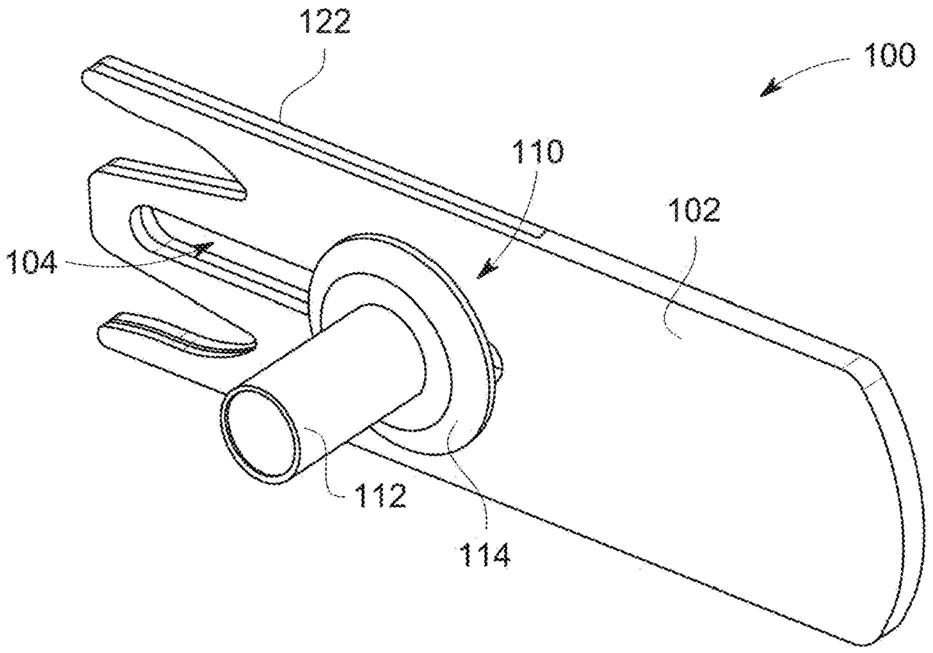
FIG. 1 is a front perspective view of the vinyl wrap cutter.

Reference will now be made in detail to the presently preferred embodiments of the invention, examples of which are illustrated in the accompanying drawings. Throughout the following detailed description, the same reference numerals refer to the same elements in all figures.

Throughout this description and in the title, reference is made to the cutter device as a vinyl wrap cutter 100, though there is no limitation as to the material that is to be cut with the vinyl wrap cutter, as it is well known in the industry to wrap vehicles with other materials such as thermoplastic polyurethane (TPU) and polyvinyl chloride (PVC) film, and it is anticipated that other materials are used or will be used to wrap vehicles.

Figure 2:
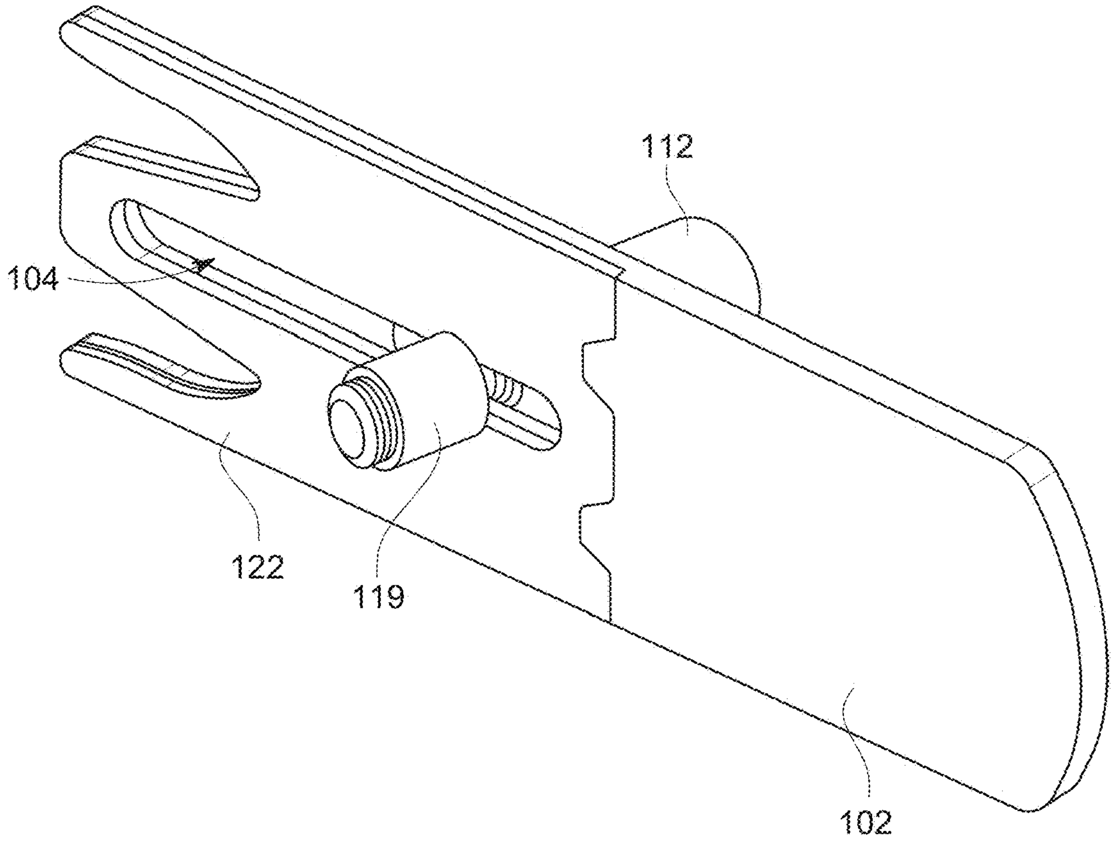
FIG. 2 is a rear perspective view of the vinyl wrap cutter.

Referring to FIGS. 1 and 2, a front perspective view and a rear perspective view of the vinyl wrap cutter 100 is shown without cutting blades installed. The vinyl wrap cutter 100 has a body portion 122/102 that has two sections, a main section 102 and a back section 122. The main section 102 and a back section 122 are shown held to each other by a fastener 117 (see FIG. 6) that also holds the guide posts 112/112A against the main section 102. The head 116 of the fastener 117 is wider than the hollow area of the guide post 112/112A. In the embodiment shown, the fastener is held by a cylindrical nut 119, though any type of nut is anticipated including a hex nut, wing nut, etc., having threads 121 that match threads 118 of the fastener 117.

The guide posts 112/112A and fastener 117 (see FIG. 6) are used to guide the vinyl wrap cutter 100 along a feature of the vehicle 200 to provide an even cut to the sheet of vinyl 250 (or other material) that matches a contour of the vehicle 200.

Figure 7:
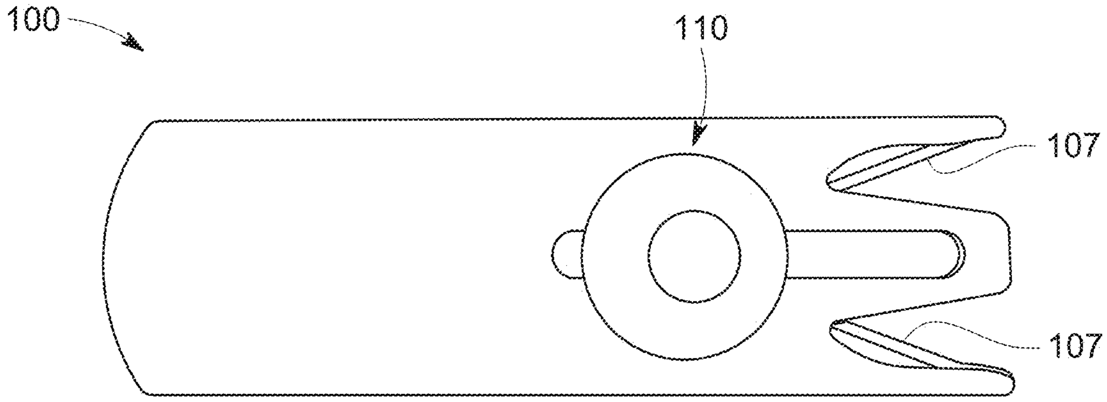
FIG. 7 is a plan view of the vinyl wrap cutter showing the blades.

The main section 102 and a back section 122 have an elongated slot 104 through which the fastener 117 passes so that the guide posts 112/112A are relocatable at a variable distance from the cutting blades 107 (see FIG. 7).

Figure 3:
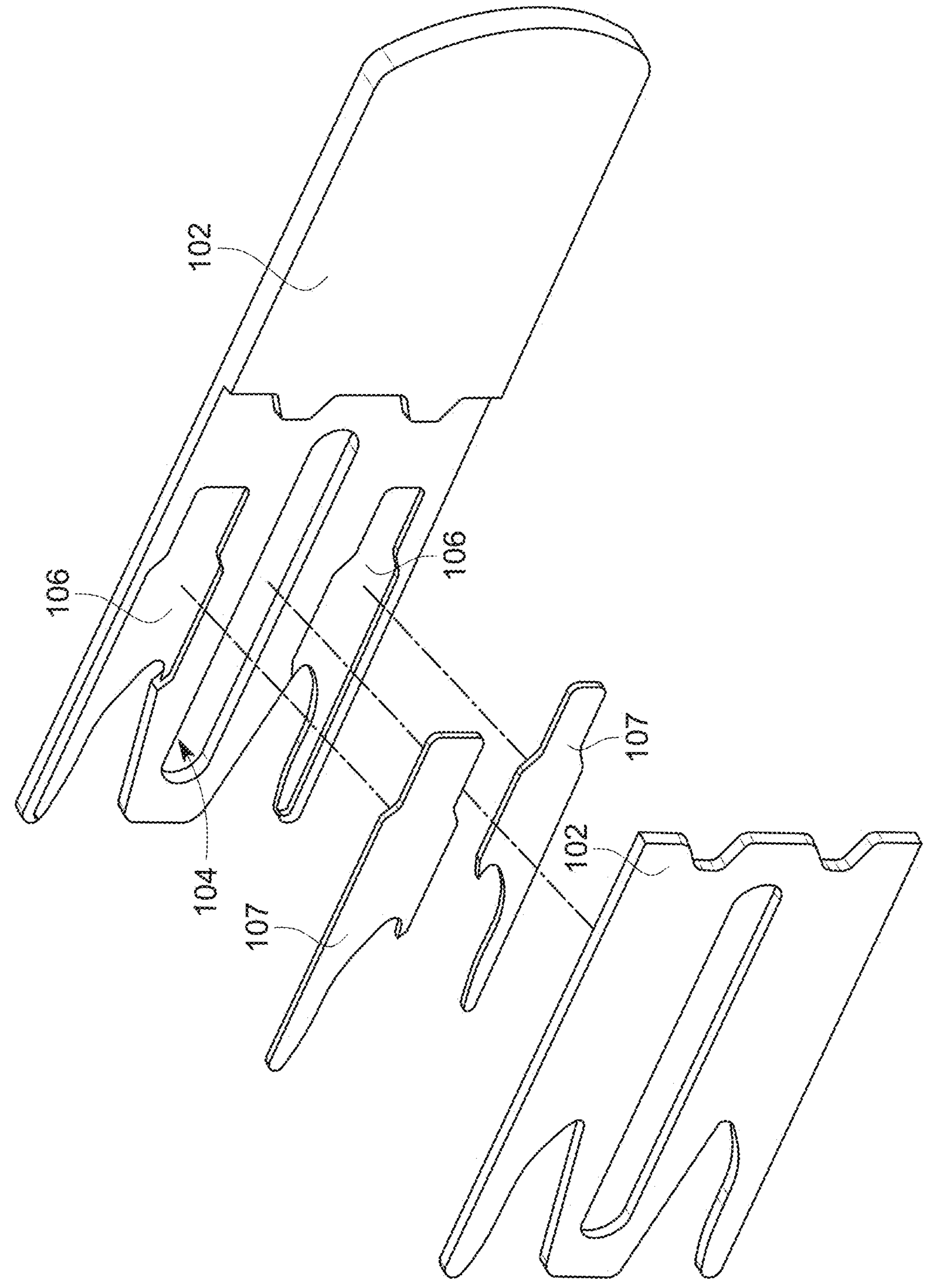
FIG. 3 is an exploded view of the vinyl wrap cutter.

Referring to FIG. 3 an exploded view of the vinyl wrap cutter 100 is shown with cutting blades 107 ready to be installed. There are indentations 106 formed in the main section 102 for accepting and holding the cutting blades 107. Alternatively, it is fully anticipated that the indentations 106 for accepting and holding the cutting blades 107 be formed in the back section 122. Note that although any blade that is sharp enough to cut vinyl or other plastic vehicle wraps (e.g., razor) is anticipated, the cutting blade 107 shown is an X-acto® blade as used in hobby applications.

Figure 6:
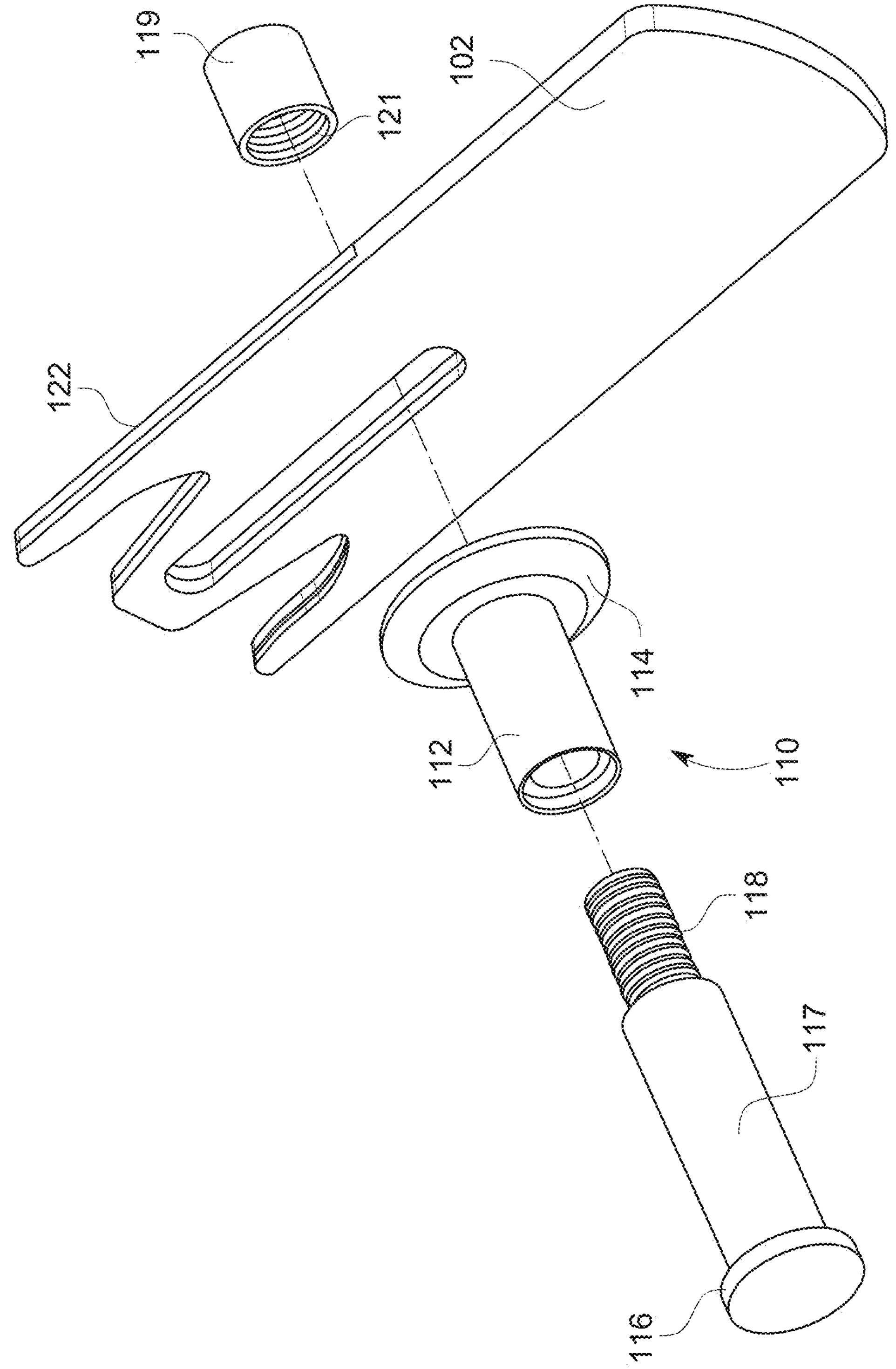
FIG. 6 is an exploded view of the guide of the vinyl wrap cutter.

After the cutting blades 107 are installed in the indentations 106, the back section 122 is positioned against the main section 102 (as shown in FIGS. 1 and 2) and the back section 122 is fastened to the main section 102 using the fastener 117 as shown in FIG. 6, thereby holding the cutting blades 107 within the indentations 106.

Note that two indentations 106 and two cutting blades 107 are shown for bi-directional cutting. It is fully anticipated that in some embodiments, there is a single indentation 106 with a single cutting blade 107.

Figure 4:
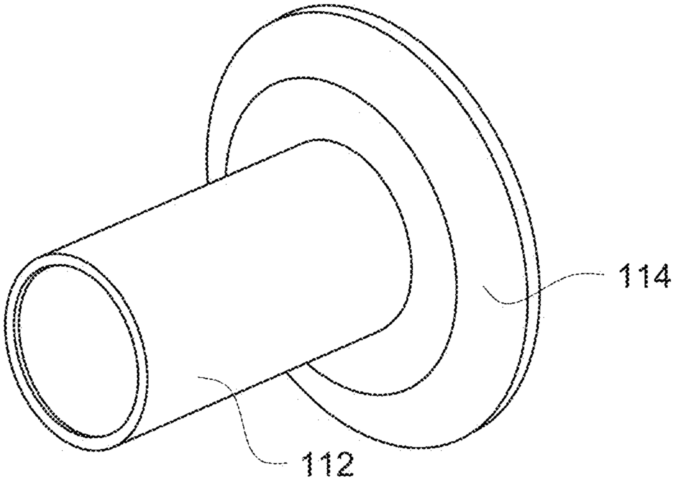
FIG. 4 is a perspective view of a first guide of the vinyl wrap cutter.
Figure 5:
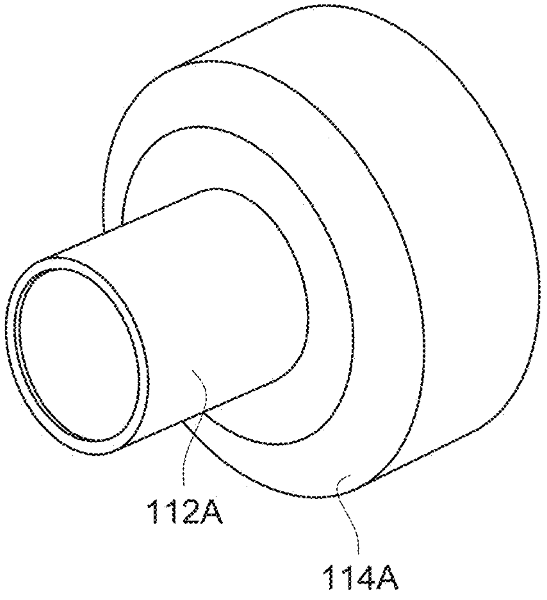
FIG. 5 is a perspective view of a second guide of the vinyl wrap cutter.

Referring to FIGS. 4 and 5, perspective views of guide posts 112/112A of the vinyl wrap cutter 100 are shown. The guide posts 112/112A have a hollow, generally cylindrical core for accepting a fastener 117 (e.g., threaded screw). Each of the guide posts 112/112A has a shoulder 114/114A that interfaces to an edge of a feature (e.g., wheel well, hood, trunk) of the vehicle 200 when cutting the sheet of vinyl 250 (or other material). The thickness of the shoulder 114/114A determines the width of the cut. The guide 110 guides the vinyl wrap cutter 100 to make a cut in the sheet of vinyl 250 (or other material) that is an equal distance from the feature for the entire cut. The vinyl wrap cutter 100 is guided along the feature by the guide 110 to cut the sheet of vinyl 250 (or other material) that, typically, has been adhered to the vehicle 200 (see FIGS. 8 and 9).

It should be noted that the first guide post 112 (see FIG. 4) has a shoulder 114 that is thinner than the second shoulder 114A of the second guide post 112A (see FIG. 5) as it is fully anticipated that the vinyl wrap cutter 100 be provided with several guide posts 112/112A having any desired shoulder 114/114A thickness. The shoulder 114/114A thickness defines the width of the cut in the sheet of vinyl 250 (or other material).

Referring to FIG. 6 is an exploded view of the guide assembly 117/112/112A/118 of the vinyl wrap cutter 100. FIG. 6 shows how the main section 102 and a back section 122 are removably held together by way of the fastener 117, guide 112/112A, and cylindrical nut 119. Note that the shoulder 114/114A of the guide post 112/112A rests against the main section 102.

Referring to FIG. 7 is a plan view of the vinyl wrap cutter 100 showing the cutting blades 107. The indentations 106 hold the cutting blades 107 such that the sharp edge of the cutting blades 107 are exposed so as to contact the sheet of vinyl 250 (or other material) for cutting the sheet of vinyl 250 (or other material) as the guide posts 112/112A of the vinyl wrap cutter 100 is pulled/pushed along a contour of the vehicle 200.

Figure 8:
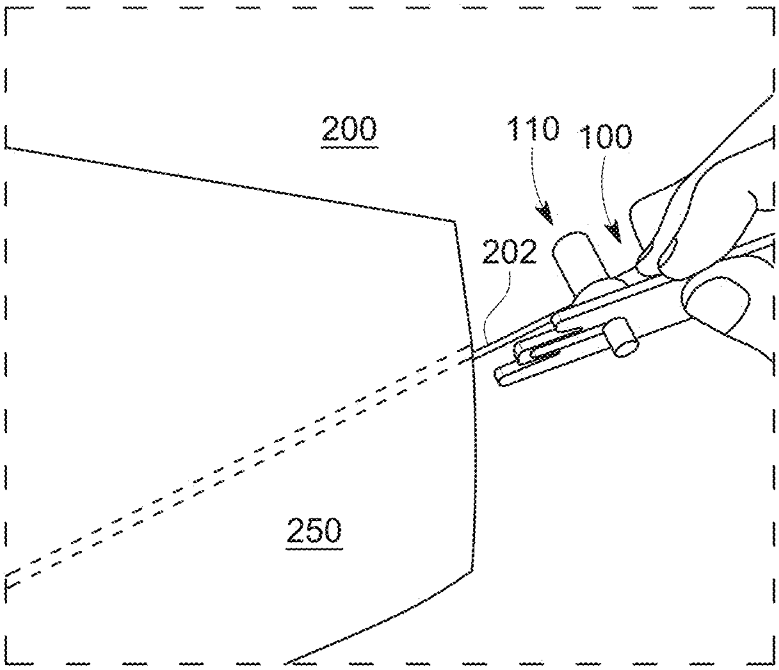
FIG. 8 is a perspective view of the vinyl wrap cutter ready to cut a sheet of vinyl that is affixed to a vehicle.
Figure 9:
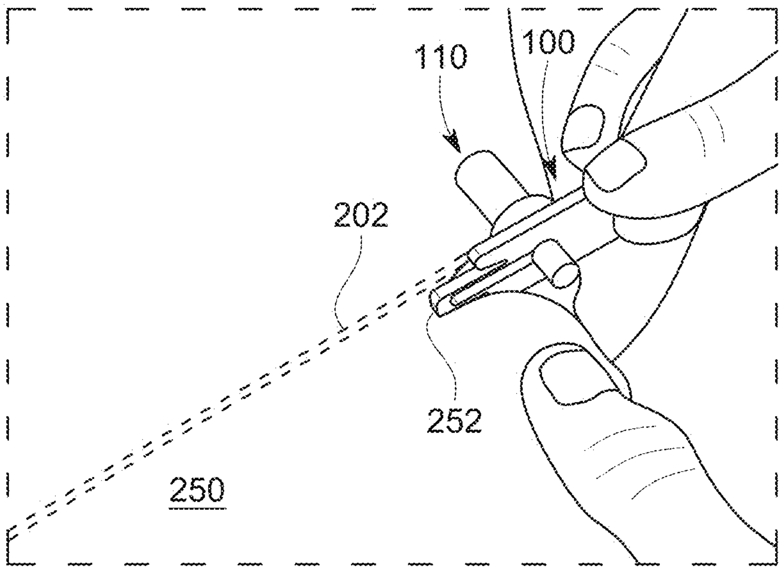
FIG. 9 is a perspective view of the vinyl wrap cutter in the process of cutting a sheet of vinyl that is affixed to a vehicle.

Referring to FIG. 8 is a perspective view of the vinyl wrap cutter 100 ready to cut a sheet of vinyl 250 (or other material) that is affixed to a vehicle 200. In this/the guide 110 is positioned toward/against the feature 202 of the vehicle 200. As shown in FIG. 9, the sheet of vinyl 250 (or other material) is positioned such that the cutting blades 107 contact the sheet of vinyl 250 (or other material) to impact cutting of the sheet of vinyl 250 (or other material).

Referring to FIG. 9 is a perspective view of the vinyl wrap cutter 100 in the process of cutting a sheet of vinyl 250 (or other material) that is affixed to a vehicle 200. As the guide 110 is held against the feature 202 (or edge) of the vehicle 200 as the vinyl wrap cutter 100 is moved to traverse the feature 202 (or edge). In doing so, the vinyl wrap cutter 100 maintains a fixed distance from the feature 202 (or edge) and, thereby, cuts the sheet of vinyl 250 (or other material) at a fixed distance from the feature 202 (or edge). In some embodiments, this allows for proper bending of the sheet of vinyl 250 (or other material) around the feature 202 (or edge) of the vehicle 200.

Basically, the use of the vinyl wrap cutter 100 includes positioning the shoulder of the guide post 112/112A to rest against a contour of the vehicle and one of the two cutting blades 107 is positioned to engage with the sheet of vinyl 250 (or other material) that has been adhered to a vehicle 200. The vinyl wrap cutter 100 is pushed/pulled across the sheet of vinyl 250 (or other material) while maintaining the guide post 112/112A of the vinyl wrap cutter 100 to rest against the contour of the vehicle 200, thereby cutting (at point 252) the sheet of vinyl 250 (or other material) at a fixed distance from each point on the feature 202 of the vehicle 200.

When one or both cutting blades 107 of the vinyl wrap cutter 100 need to be replaces, the nut is listened and removed from the fastener 117 and the main section 102 is separated from the back section 122. The cutting blade(s) 107 is/are removed and new cutting blade(s) 107 is/are placed in the indentation(s) 106. Now the fastener 117 is passed through the elongated slot 104, the cylindrical nut 119 is reattached and tightened.

When a different cutting width is desired, the nut is loosened and removed from the fastener 117 and the main section 102 is separated from the back section 122. The guide post 112/112A is removed from the fastener 117 and replaced with another guide post 112/112A (same size or different height). Now the fastener 117 is passed through the elongated slot 104, the cylindrical nut 119 is reattached and tightened.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

The invention claimed is:

1. A vinyl wrap cutter comprising:

a main section and a back section; the main section and the back section forming a body of the vinyl wrap cutter, the body of the vinyl wrap cutter having an elongated slot;

an indentation formed in either the main section or the back section;

a cutting blade held in the indentation;

a guide post having a hollow core and having a shoulder; and a fastener; the fastener being longer than the guide post and inserted in the hollow core, extends through the elongated slot and held in place by a nut, thereby the fastener holds the guide post to the body of the vinyl wrap cutter and holds the main section to the back section.

2. The vinyl wrap cutter of claim 1, wherein the nut is a cylindrical-shaped nut that has threads that match threads of the fastener.

3. The vinyl wrap cutter of claim 1, further comprising: a second indentation formed in either the main section or the back section and a second cutting blade held in the second indentation.

4. A cutting device for cutting a sheet of material that is adhered to a vehicle, the cutting device comprising:

a main section and a back section; the main section and the back section forming a body of the cutting device, the body of the cutting device having an elongated slot;

two indentations formed in either the main section or the back section;

two cutting blades, each cutting blade of the two cutting blades held in a respective indentation of the two indentations;

a guide post having a hollow core and having a shoulder; and a fastener; the fastener being longer than the guide post, the fastener inserted in the hollow core and extends through the elongated slot and held in place by a nut, thereby the fastener holds the guide post to the body of the cutting device and holds the main section to the back section.

5. The cutting device of claim 4, wherein the nut is a cylindrical-shaped nut that has threads that match the threads of the fastener.

6. A method for cutting a sheet of material that is adhered to a vehicle, the method comprising:

providing the cutting device as in claim 4;

positioning the shoulder of the guide post of the cutting device to rest against a feature of the vehicle;

positioning one of the two cutting blades to engage with the sheet of material that is adhered to the vehicle; and pushing the cutting device across the sheet of material while maintaining the guide post of the cutting device resting against the feature of the vehicle, thereby cutting the sheet of material a fixed distance from each point on the feature of the vehicle.

7. The method of claim 6, further comprising:

removing the nut from the fastener;

separating the main section from the back section;

removing one of the two cutting blades from the respective indentation;

placing a new cutting blade in the respective indentation;

rejoining the main section to the back section;

passing the fastener through the guide post and through the elongated slot; and attaching and tightening the nut to the fastener.

8. The method of claim 6, further comprising:

removing the nut from the fastener;

separating the main section from the back section;

removing the guide post;

replacing the guide post with a new guide post;

rejoining the main section to the back section;

passing the fastener through the new guide post and through the elongated slot;

attaching and tightening the nut to the fastener; and pushing the cutting device across the sheet of material while maintaining the new guide post of the cutting device resting against the feature of the vehicle, thereby cutting the sheet of material a second fixed distance from each point on the feature of the vehicle, the second fixed distance being unequal to the fixed distance.

9. The method of claim 8, wherein the new guide post is taller than the guide post and when pushing the cutting device across the sheet of material while maintaining the new guide post of the cutting device resting against the feature of the vehicle, cutting the sheet of material the second fixed distance from each point on the feature of the vehicle, the second fixed distance being greater than the fixed distance.

10. The method of claim 8, wherein the new guide post is shorter than the guide post and when pushing the cutting device across the sheet of material while maintaining the new guide post of the cutting device resting against the feature of the vehicle, cutting the sheet of material the second fixed distance from each point on the feature of the vehicle, the second fixed distance being less than the fixed distance.

11. The method of claim 6, wherein the feature is a wheel well of the vehicle and when pushing the cutting device across the sheet of material, maintaining the guide post of the cutting device resting against the wheel well.

12. The method of claim 6, wherein the feature is an edge of a hood of the vehicle and when pushing the cutting device across the sheet of material, maintaining the guide post of the cutting device resting against the edge of the hood.

13. The method of claim 6, wherein the feature is an edge of a door of the vehicle and when pushing the cutting device across the sheet of material, maintaining the guide post of the cutting device resting against the edge of the door.

14. The method of claim 6, wherein the feature is an edge of a trunk of the vehicle and when pushing the cutting device across the sheet of material, maintaining the guide post of the cutting device resting against the edge of the trunk.

15. The method of claim 6, wherein when positioning one of the two cutting blades to engage with the sheet of material that is adhered to the vehicle, the sheet of material comprises thermoplastic polyurethane.

16. The method of claim 6, wherein when positioning one of the two cutting blades to engage with the sheet of material that is adhered to the vehicle, the sheet of material comprises polyvinyl chloride.

* * * * *